Jan. 1, 1935.  A. E. MUNKEL  1,986,518
BEVERAGE CONTAINER
Filed Oct. 18, 1933  2 Sheets-Sheet 1

INVENTOR
Adolph E. Munkel
BY
Wood & Wood ATTORNEYS

Jan. 1, 1935.  A. E. MUNKEL  1,986,518
BEVERAGE CONTAINER
Filed Oct. 18, 1933   2 Sheets-Sheet 2
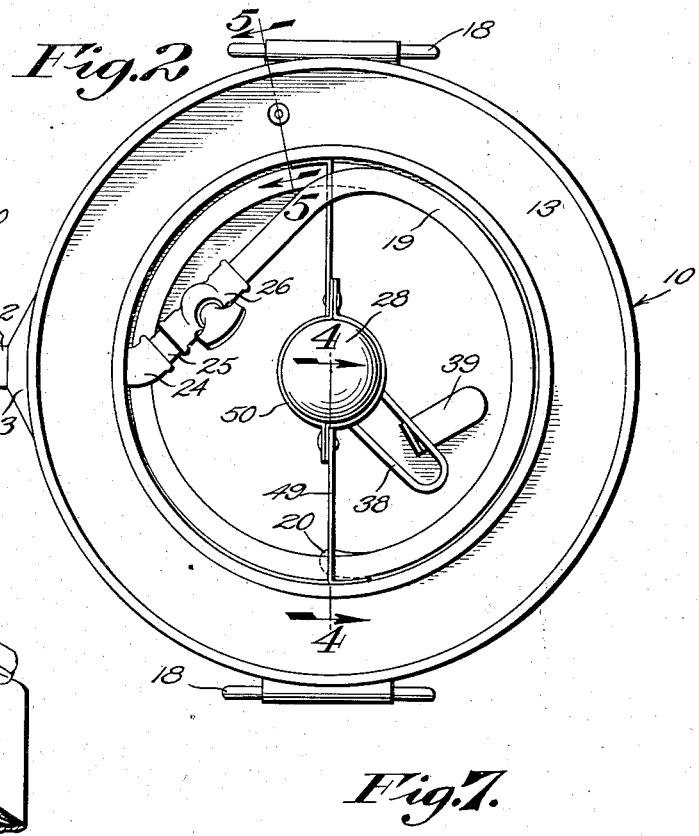
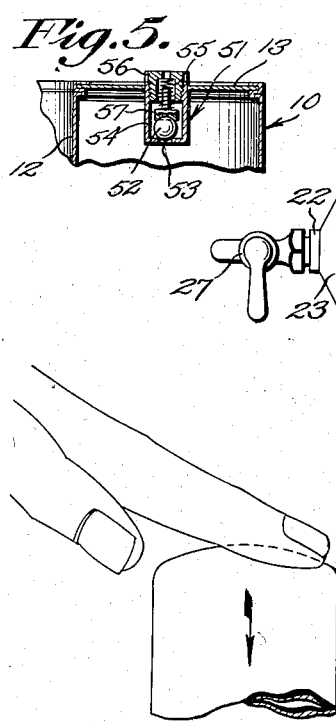
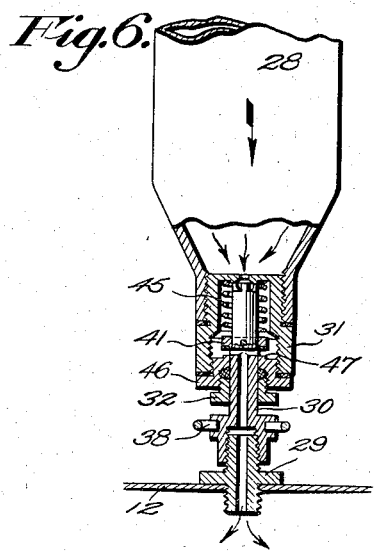
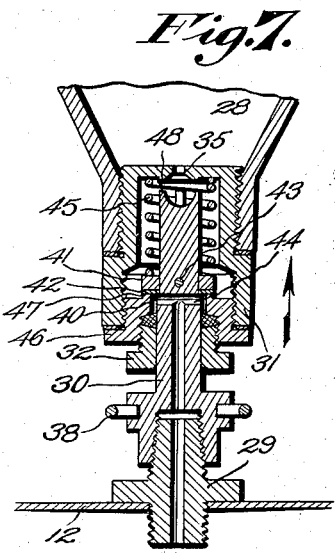
INVENTOR
Adolph E. Munkel
BY Wood & Wood ATTORNEYS Patented Jan. 1, 1935

1,986,518

UNITED STATES PATENT OFFICE 1,986,518

BEVERAGE CONTAINER

Adolph E. Munkel, Columbus, Ohio

Application October 18, 1933, Serial No. 694,148

5 Claims. (Cl. 225—18)

This invention relates to beverage containers and is particularly directed to a portable container for use in delivering, cooling and charging the beverage.

It is the object of this invention to provide a portable container for beverages such as draft beer, which container incorporates a cooling medium and a charging medium, which mediums are readily put in service by the consumer and compactly contained in the apparatus as delivered. In other words, the purpose of this invention is to provide containers for delivery purposes, whereby a supply of beer may be delivered to the customer in a container which can be set up readily and which includes means for icing and charging, whereby the user does not have to employ the usual awkward means for icing the beer. By means of the present apparatus draft beer can be served at home from the delivered container without inconvenience to the consumer and without the necessity of transfer from the delivery container to other storage means.

Other objects and further advantages will be more fully apparent from a description of the accompanying drawings, in which:

Figure 2 is a top plan view of the container with the lid removed.

Figure 5 is a fragmentary sectional view taken on line 5—5, of Figure 2.

Figure 6 is a fragmentary partial sectional view of the carbonic gas cylinder showing the manipulation of the same through modified mechanism for permitting flow of gas into the contents of the container.

Figure 7 is an enlarged fragmentary sectional view taken similar to Figure 3, but showing the modified valve and gas cylinder structure of Figure 6.

Figure 1:
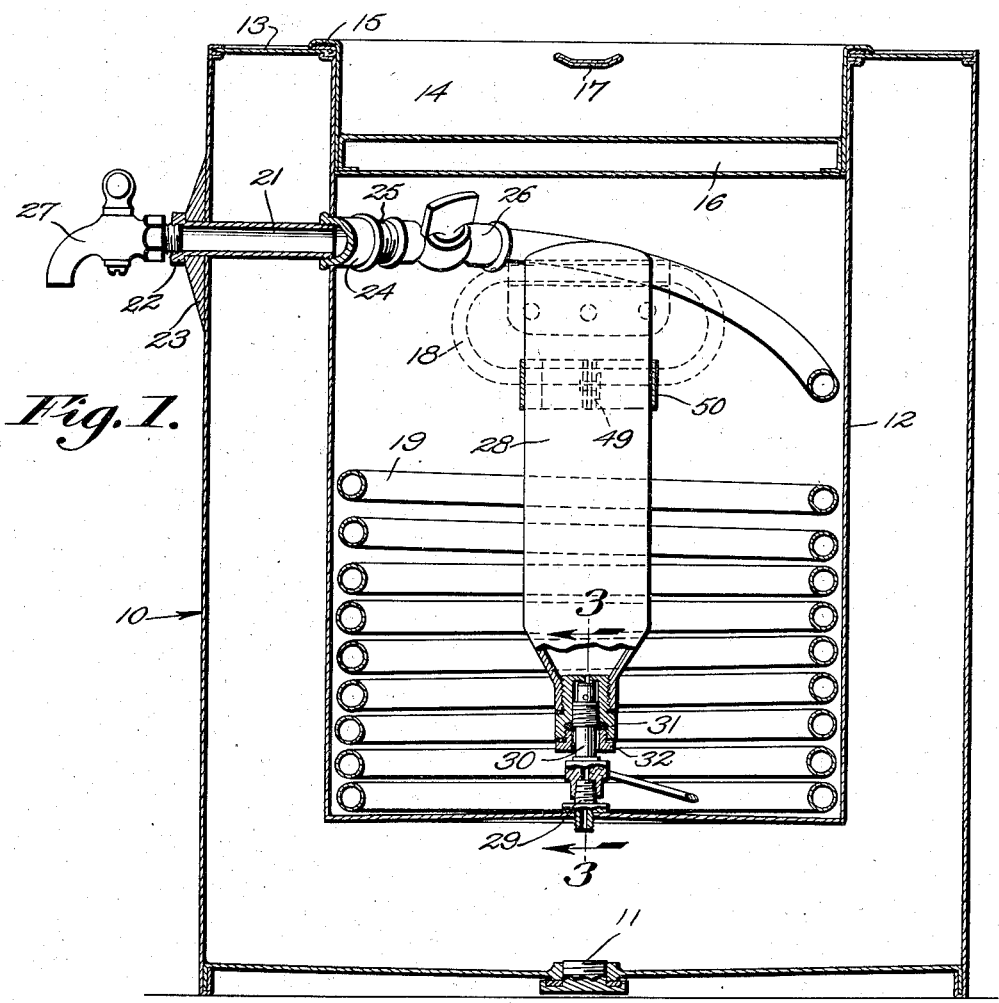
Figure 1 is a sectional view taken centrally of the portable beverage dispensing and charging apparatus of this invention.

The container and dispenser is constructed to provide two chambers, namely, a cooling chamber and a beverage container surrounding the cooling container. The cooling chamber houses the cooling coil and a carbonic gas cylinder for charging the beverage. A lid is included for this chamber.

Referring to the drawings, it will be observed that the portable container is in the form of a cylindrical drum 10. The drum is formed from sections of sheet metal and includes a drain plug 11 in its base. A bucket 12 is mounted axially within the main container. This bucket is suspended from the top plate 13 of the main container drum 10. Any form of metal joint may be used in assembling the various sections making up the container.

A space is thus provided between the walls of the respective buckets, which space constitutes the container or storage space for the beverage. The lid 14 is mounted in the top of the inner bucket structure. This lid includes an annular flange 15 engaging the top of the bucket and a double wall structure 16 is incorporated at the base of the closure cap. A cross piece 17 is disposed diametrically across the recess portion of the cap constituting a handle for the cap.

The container includes bails 18 at its respective sides for convenience in transporting the same. The inner chamber constitutes the ice compartment previously mentioned, so that the beverage surrounds the ice supply. The cooling coil 19 has its lower end 20 in communication with the beverage chamber and is disposed within the ice compartment. The coils of the cooling pipe are formed on a diameter slightly less than the diameter of the ice container, so that the coils fit close to the walls of the container.

The upper end of the coil extends to the exterior of the bucket through the walls of the inner and outer bucket structures. For this purpose a pipe sleeve 21 is extended across the beverage chamber and is supported in the respective walls. This pipe sleeve includes a headed outer end 22 secured against a thickened portion 23 of the outer bucket wall. The inner end of the sleeve is screw-threaded and an elbow 24 is fastened thereon from the inside of the ice chamber. A screw-threaded nipple 25 extends from the elbow and has a valve 26 screwed thereon at the upper end of the coil. A tap or faucet 27 is removably screwed onto the outer end of the pipe sleeve for dispensing the contents of the container.

A carbonic gas charge for the beverage is supplied and carried with the container. For this purpose a small supply cylinder 28 of carbonic gas is mounted axially within the ice container. This container is screwed on a fitting 29 fixed in the bottom of the ice container. A generally cylindrical valve element 30 or discharge nozzle is screwed into the lower end of the carbonic gas cylinder as a part thereof.

Figure 3:
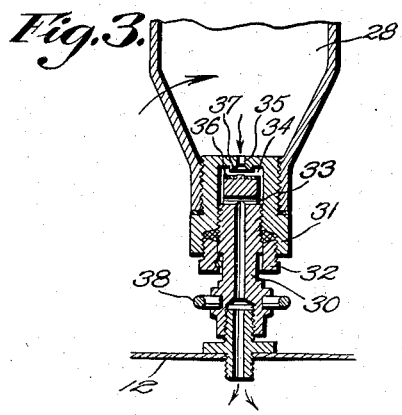
Figure 3 is an enlarged fragmentary sectional view taken on line 3—3, of Figure 1.
Figure 4:
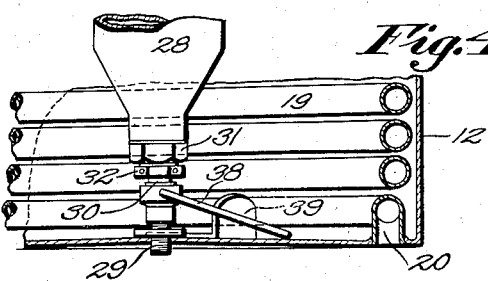
Figure 4 is a fragmentary sectional view taken on line 4—4, of Figure 2.

This valve element has an internally screw-threaded passageway extending from its lower end axially therethrough. As shown in Figures 1 and 3, the valve element is screwed into the carbonic gas container internally of a closure element 31 at the lower end of the carbonic gas container. A packing gland 32 is mounted in the carbonic gas container about the valve element.

The inner or upper end of the valve element is flat. The internal passageway thereof opens radially outwardly as at 33 below the end. This outlet end of the valve element is contained within a chamber 34 of the container closure element 31. A port 35 is extended through the top wall of the closure cap into this chamber coaxially with the valve. The flat upper end of the top of the valve has a valve seat disc 36 fixed thereon. This valve seat disc cooperates with an inwardly extended seat flange 37 surrounding the outlet port 32.

The valve of the container is screwed toward and from said seat 37 to engage the valve disc against the seat. After the carbonic gas tank 28 has been screwed into position on the fitting 29, a wire loop 38 projecting from the valve element, engages over an abutment lug 39 secured on the floor of the container, whereby rotation of the valve on the fitting is prevented. A slight rotation of the container on the secured valve element in an anticlockwise direction moves the seat from the valve disc and the carbonic gas may then flow through the valve and fitting into the beverage tank.

In the modified form of container and valve shown in Figures 6 and 7, the structures are the same except for changes permitting operation of the valve by downward pressure on the container in an axial direction. In this form the upper end of the valve element or nozzle is provided with a shoulder 40. A valve seat disc 41 having a seating washer 42 on its under face is secured on the shoulder 40 of the valve element or nozzle by means of a cross pin 43. The passageway extending through the nozzle or valve element extends radially outwardly just beneath the valve disc as at 44.

A coil spring 45 under compression is provided about the upper end of the nozzle or valve element lying between the inner end of the closure thimble 31 and the valve disc 41. A valve seat element or closure cap 46 is screwed into the lower end of the main closure 31 of the carbonic gas tank, this element including an upwardly extended annular flange 47 forming the valve seat, the valve disc 41 overlying this annular flange. When the operator presses downwardly on the carbonic gas tank, the entire tank and all parts with the exception of the nozzle or valve 30 and the valve disc 41 are slid downwardly on the nozzle. This action moves the valve seat element 46 away from the valve disc 41. This movement is limited by engagement of the inner wall of the main closure 31 with a series of projections 48 extended upwardly from the upper end of the valve element 30. The gas is then free to flow through the outlet orifice 35 downwardly around the valve disc 41 and into the central passageway of the nozzle through the radial passageways. Upon release of the container from pressure under the hand of the operator, the heavy spring 45 forces the tank upwardly and contact is again established between the valve disc 41 and the seat 47.

The carbonic gas cylinder is maintained in position against lateral displacement by means of a bracket 49 extending diametrically across and within the ice chamber and including a central circular band portion 50 into which the tank may be inserted. A safety valve 51 is provided in the upper wall of the beverage compartment consisting of a ball valve 52 engaging over the orifice 53 in the end of a thimble 54 and the ball normally held in position by means of a coil spring 55 under compression between an end cap 56 and a ball engaging element 57.

Having described my invention, I claim:

1. A portable beverage dispensing container of cylindrical form including coaxially arranged chambers, the outer constituting a beverage storage space and the inner an ice space, conduit means for passing the beverage through the ice containing chamber and to the outside of the container, and means within the ice chamber for supplying carbonic gas to the outer chamber for charging the beverage.

2. A liquid dispensing apparatus, comprising, inner and outer chambers, the outer forming a beverage storage space and the inner an ice space, means for emptying the contents of said beverage storing space, a fitting in the ice chamber wall, a carbonic gas tank mounted in said ice chamber, and a valve and coupling element for attaching the carbonic gas container to the fitting and controlling the flow of the carbonic gas through the fitting into the beverage chamber.

3. A beverage merchandising dispensing container, comprising, a double wall drum, constituting a refrigerant chamber and a beverage storage chamber for holding the beverage under pressure, a discharge conduit communicating with said storage chamber and circulating in said refrigerant chamber, and a holder for a pressure medium within the refrigerant chamber and communicating with said beverage chamber.

4. A beverage container, comprising, a double wall drum forming an inner chamber having an open upper end and a closure cap therefor, a cooling coil extending from the space surrounding the inner chamber through the inner chamber and extending outwardly therefrom through the walls of the drum to the exterior thereof, a tap on the end of said cooling coil, a fitting disposed in the bottom of the drum axially thereof, a charging cylinder mounted axially within the drum, means for supporting said cylinder, and coupling means for connecting said cylinder to said fitting.

5. In a cooling and charging apparatus, a beverage storage chamber, a cooling chamber, a beverage charging tank mounted in said cooling chamber, a fitting in the wall of the cooling chamber communicating with the beverage storage chamber, a valve and coupling element attachable to said fitting including a central bore extending substantially to its outer end and radially projected, a closure in the end of the beverage charging tank including a central orifice and a screw-threaded bore adapted to be screwed on the valve element and cooperating valve seat portions in the top of the closure and on the top of the valve element, whereby, when the beverage charging tank is screwed in one direction, valve seat contact is established.

ADOLPH E. MUNKEL.